United States Patent Office 3,043,851
Patented July 10, 1962

3,043,851
2-VINYL-4-(DELTA-HYDROXYBUTYL)-
1,3-DIOXOLANES
Rudolph F. Fischer, Dobbs Ferry, N.Y., and Curtis W. Smith, Berkeley, Calif., assignors to Shell Oil Company, New York, N.Y., a corporation of Delaware
No Drawing. Filed Nov. 3, 1960, Ser. No. 66,918
3 Claims. (Cl. 260—340.9)

This invention relates to the manufacture of cyclic acetals. It deals with production of a novel class of hydroxy-substituted unsaturated cyclic acetals whose unique structure imparts especially advantageous properties to the new compounds and makes them particularly useful in the preparation of surface-coating materials.

The new substituted cyclic acetals of the invention are hydroxyalkyl-substituted acetals of unsubstituted alpha, beta-ethylenic aldehydes of 3 to 12 carbon atoms per molecule, particularly of acrolein, alpha-chloroacrolein or alpha-alkyl acroleins having 1 to 9 carbon atoms in the alkyl group and saturated, aliphatic polyols of 5 to 10 carbon atoms per molecule composed only of carbon, hydrogen and hydroxyl oxygen atoms and containing a pair of carbinol groups which are separated from each other by not more than one carbon atom and having another carbinol group further removed from said pair of carbinol groups. Especially advantageous new acetals are the 1,3-dioxolanes and 1,3-dioxanes substituted in the 2-position by a vinyl group which contains a terminal methylene radical and have a carbinol group which is linked to a carbon atom of the heterocyclic ring by a divalent alkylene radical having at least two carbon atoms in the linking chain. Particularly useful acetals are the hydroxyalkyl-2-vinyl-1,3-dioxolanes of this type having 8 to 22 carbon atoms per molecule which are represented by the formula:

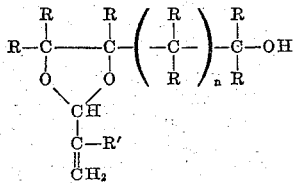

wherein each R represents a hydrogen atom or lower alkyl radical, R' represents a hydrogen or chlorine atom or lower alkyl group and $n$ is an integer equal to 2 to 7. Corresponding 1,3-dioxanes which constitute another subgroup of the new compounds are represented by the formula:

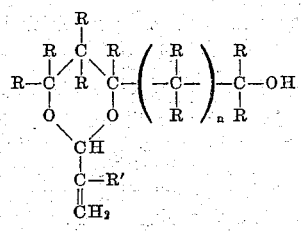

where R' and the R's have the same significance as in the previously discussed formula, but $n$ is an integer equal to 2 to 6.

The new substituted acetals can be produced successfully by the method of acetal manufacture described and claimed in our copending application Serial No. 802,287 filed March 27, 1959, which has now issued as U.S. 2,987,524 of which this application is a continuation-in-part and which is itself a division of our application Serial No. 527,126, filed August 8, 1955, now United States Patent No. 2,888,492. In accordance with this method the new compounds of the invention are made by reacting alpha,beta-ethylenic aldehydes and triols having the previously indicated suitable structures in the presence of a catalytic amount of a sulfo acid at about 60° to 100° C. while removing the water formed in the reaction.

Since it is essential that the new acetals have a terminal methylene radical in the vinyl group linked to the heterocyclic ring, the starting aldehyde when using this method of manufacture, must be an alpha-methylidene alkanal. Suitable examples of such aldehydes are acrolein, alpha-chloroacrolein, methacrolein, alpha-ethyl acrolein, alpha-isopropyl acrolein and like alpha-alkyl acroleins having not more than 9 carbon atoms in the alkyl group. The triols which are reacted with these aldehydes are those having two carbinol groups separated by not more than one carbon atom, the third carbinol group being linked to said pair of carbinol groups by an alkylene radical containing at least two carbon atoms in the linking chain. The use of this type of starting triol is essential in this method of producing the compounds of the invention. If triols having the third hydroxyl more closely linked to the said pair of carbinol groups are used one not only obtains mixed products as a result of involvement of the third hydroxyl in acetal formation but also the individual compounds produced will have less desirable properties. It is also essential for this method of production of the new hydroxy vinyl acetals that polyols with only the three specified hydroxyl groups be used in the reaction since additional hydroxyl groups can interfere with production of the desired products and also will give products of higher functionality which can lead to undesirable side reactions during subsequent use, particularly cross-linking in the case of reactions with polycarboxylic acids for instance. The polyols advantageously contain 5 to 10 carbon atoms, per molecule. Particularly preferred are those having a primary carbinol group linked by a polymethylene chain of 2 to 7 carbon atoms to the carbinol carbon atom of one of the pair of carbinol groups which are to form the cyclic acetal ring. Typical of the triols of this type which are especially useful for production of the new hydroxyalkyl-substituted-2-vinyl-1,3-dioxolanes of the invention are, for instance, 1,2,5-pentanetriol; 1,2,6-hexanetriol; 2,3,6-hexanetriol; 2-methyl-1,2,5-pentanetriol; 2-methyl-2,3,6-hexanetriol; 1,2,8-octanetriol; 2,4,4-trimethyl-1,2,5-pentanetriol; 1,2,10-decanetriol; 2,3-dimethyl-2,3,8-octanetriol; 1,8,9-octadecanetriol and the like. Representative examples of starting triols for production of the related new 2-vinyl-1,3-dioxanes are 1,3,6-hexanetriol; 1,3,8-octanetriol; 2,4,10-decanetriol, etc. Also useful as starting polyols are those which form cyclic acetals having a non-primary carbinol group such, for instance, as 1,2,5-hexanetriol; 6-methyl-1,2,6-heptanetriol; 2,3,9-decanetriol; 2-methyl-2,4,8-nonanetriol, and the like.

The reaction can be carried out conveniently by heating a mixture of the chosen alpha,beta-ethylenic aldehyde and polyol, preferably containing about 5 to 50% excess of aldehyde over the stoichiometric requirement for the reaction, dissolved or suspended in a suitable liquid such as, for instance, benzene, dichloroethylene, etc. By refluxing at about 50° to 90° C. under a phase-separating head until the theoretical amount of water is removed, the reaction is completed in about 1 to 3 hours and high yields of unsaturated cyclic acetals are obtained.

It is important in this new method of producing cyclic unsaturated acetals to use sulfo acid catalysts. The sulfo acids which can be used include such acids as sulfuric acid, the toluenesulfonic acids including p-toluenesulfonic acid, enthanesulfonic acid, and the like. Proportions of sulfo acid in the range of 0.02 to 0.06 mole percent, based on the amount of ethylenic aldehyde present, are particularly advantageous. When less than 0.02 mole percent of catalyst based upon the starting alpha,beta-ethylenic aldehyde is used, the reaction time must be prolonged and plant capacity is correspondingly reduced with consequent increased operating cost. If more than 0.06 mole percent catalyst is used, the yield of unsaturated acetal is reduced as a result of addition of hydroxyl to the ethylenic double bond.

The following examples illustrate the production of the new compounds of the invention by this method but it will be understood that these novel hydroxyalkyl-substituted-2-vinyl-1,3-dioxolanes and dioxanes can be made in other ways without departing from the invention.

*Example I*

1,2,6-hexanetriol was thoroughly mixed with 50% excess of acrolein, one to three volumes of benzene and 0.020 mole of p-toluenesulfonic acid per mole of acrolein. The mixture was then refluxed vigorously under a phase-separating head for 2.5 hours at which time evolution of water had ceased. After the excess of acrolein and some benzene had been removed by atmospheric distillation through the head, the residue was cooled, and an excess of calcium oxide was stirred into the solution. After filtration, the liquid was stripped and distilled at reduced pressure. The product, 2-vinyl-4-(delta-hydroxybutyl)-1,3-dioxolane, boiling at 95°–105° C. at 0.2 mm. and having a refractive index $n_D^{20}$ 1.4641, was recovered in 88% yield based on an 88% conversion of 1,2,6-hexanetriol to product.

| Analysis | Carbon | Hydrogen | Hydroxyl Value (equivalents per 100 grams) |
| --- | --- | --- | --- |
| Calculated | 62.7 | 9.4 | 0.58 |
| Found | 62.3 | 9.4 | 0.63 |

*Example II*

Similar reaction of methacrolein with 1,2,6-hexanetriol gives 2-isopropenyl-4-(delta-hydroxybutyl)-1,3-dioxolane of the formula

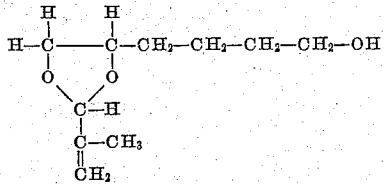

*Example III*

Substituting 1,8,9-octadecyltriol, obtainable by hydroxylation of oleyl alcohol, for the hexanetriol of Example I, a good yield of 2-vinyl-4-(omega-hydroxyoctyl)-5-octyl-1,3-dioxolane

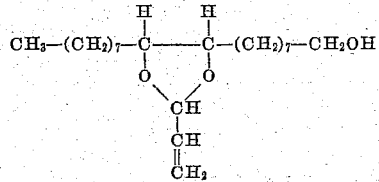

is obtained.

*Example IV*

The production of 2-isopropenyl-4-ethyl-6-(omega-hydroxypentyl)-1,3-dioxane by reaction of methacrolein with 3,5,10-decanetriol is carried out by charging a 500 ml. three-necked flask equipped with a stirrer and reflux condenser and phase-separating head with about 1.1 moles of methacrolein, about 0.9 mole of the triol, 0.1 gram para-toluenesulfonic acid and 250 ml. of benzene. The mixture is refluxed for about 3 hours while water is removed. The solution is then stirred with 2 grams of calcium carbonate, filtered and distilled to take off the unreacted methacrolein and the product is then recovered by distillation at 1 mm. pressure. Formula

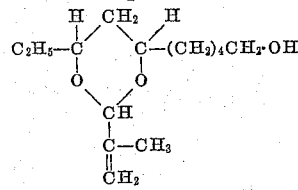

*Example V*

Reaction in the same way using acrolein and 1,2,7-heptanetriol gives a good yield of 2-vinyl-4-(omega-pentyl)-1,3-dioxane.

*Example VI*

When an equal mole proportion of alpha-chloroacrolein is used in place of the acrolein for reaction with 1,2,6-hexanetriol by the method of Example I, a similar good yield of 2-(alpha-chlorovinyl)-4-(delta-hydroxybutyl)-1,3,-dioxolane is obtained.

In addition to their use as intermediates in the conversion of the starting alpha,beta-ethylenic aldehydes to polyols according to the invention, the new compounds are also advantageous in the preparation of other derivatives. They can be reacted with conjugated diolefinic compounds such as butadiene to form Diels-Alder type adducts or with aldehydes to produce acetals of gamma-ketoaldehydes by addition of the aldehyde at the vinyl group of the cyclic acetal by free radical-catalyzed reaction for example. Still other useful products can be produced from these new compounds.

The new products combine in the same molecule a unique structural relationship between two reactive functional groups. These are a terminal methylene radical-containing vinyl group linked directly to a dioxy carbon atom of a cyclic acetal group and a carbinol group attached to the heterocyclic ring by a chain of at least two carbon atoms. This special relationship of these functional groups to each other gives the compounds a unique combination of properties which make them particularly useful as starting materials for manufacture of polymeric compositions. Thus a plurality of the new vinyl-substituted acetals can be linked together by reaction with an aliphatic or aromatic carboxylic acid and the resulting polyester can then be polymerized through its vinyl double bonds to make homo- or co-polymers with attractive characteristics. Alternatively, but usually less advantageously one can polymerize the new cyclic acetals through the vinyl groups and react the resulting linear polymer with a carboxylic acid, most advantageously a dicarboxylic acid which will effect cross linking through the hydroxyl groups of the polymer chains. In either case, special advantages result from the location of the hydroxyl group on a chain so that it is separated by at least three carbon atoms from the heterocyclic ring to which it is attached. This imparts to the polymers a flexibility which is lacking in those made from the corresponding acetals having the carbinol directly linked to the ring and makes them particularly useful for surface coating. The vinyl group of the new compounds is particularly reactive because of its special structure. As a result both the new compounds themselves and their products of esterification or ether or acetal formation at the carbinol group polymerize readily to valuable resinous products. A special feature of the new compounds is their ability to form self plasticized polymers when polymerized after at least partial esterification with a long chain acid or by partial esterification of the free hydroxyl groups in the polymer of the unesterified vinyl cyclic acetal. Instead of homopolymerization of these derivatives, they can be successfully copolymerized with other mono- or polyethylenic polymerizable compounds.

The character of the polymer which is produced can be varied from low molecular liquid products to higher molecular solids by control of the temperature and time of polymerization and the type and amount of polymerization catalyst used, if any is employed. With peroxide catalysts such, for example, as benzoyl peroxide, ditertiary butyl peroxide, tertiary butyl hydroperoxide, methyl ethyl ketone peroxide and the like which are generally used in amounts of the order of 1% or less to about 5%, temperatures in the range of about 50° to about 150° C. can be used. The polymerization can be conducted batchwise, continuously or intermittently. Solvents or non-solvent diluents, for instance inert organic liquids such as aliphatic or aromatic hydrocarbons, are sometimes useful for carrying out the reaction. Due to the high reactivity of the new compounds and their derivatives with oxygen it is often advantageous to exclude air in order to better control the polymerization but with some derivatives it may be desirable to rely upon atmospheric oxygen for effecting the polymerization. Especially when preparing polymers for use in surface coating it may be advantageous to carry out a partial polymerization to a liquid or to a soluble resin which can then be further polymerized after application to the surface which is to be protected.

Suitable methods of polymerization of a typical hydroxyalkyl-2-vinyl-1,3-dioxolane of the invention are illustrated in the following example.

*Example VII*

2-vinyl-4-(delta-hydroxybutyl)-1,3-dioxolane was polymerized by heating with about 1% by weight of benzoyl peroxide in a glass vessel in an oven at 70° C. After 2½ hours during which the exothermic reaction raised the temperature to 150° C., the mixture was removed from the oven and cooled to 70° C. at which temperature it was maintained for about 40 hours after which it was vacuum distilled and the residue was recovered as a light colored, thermoplastic resin soluble in ethanol, benzene and acetone.

Harder products are obtained by copolymerizing in the same way equal mole proportions of this same monomer and styrene. By substituting ethyl acrylate for the styrene solid resin of greater clarity is obtained. Esters of the 2-vinyl-4-(delta-hydroxybutyl)-1,3-dioxolane polymerize in the same way.

Thermosetting products are obtained by substituting a polyethylenic compound for the foregoing monoethylenic compounds copolymerized with the new vinyl hydroxyalkyl dioxolane. Thus with an equal mole proportion of butadiene excellent resins are produced. The proportion of the ethylenic compound or mixtures of compounds used in making copolymers of the new compounds of the invention can be varied widely, but as a rule the best results will be obtained when the 2-vinyl-(hydroxyalkyl)-1,3-dioxolane or dioxane or mixture of these makes up about 10 to about 90 mole percent of the total monomers.

Instead of free radical catalyzed polymerization, one can use other catalysts when making homopolymers or copolymers of the new unsaturated acetals. Polymerization via addition of the free hydroxyl group of one molecule to the double bond of the vinyl group of another molecule takes place readily with acidic catalysts. Suitable acidic catalysts include, for instance, phosphoric acid, para-toluene sulfonic acid, oxalic acid, zinc fluorborate, boron trifluoride, and the like. Nearly colorless resins with outstanding transparency have been made in this way as shown by the following typical example.

*Example VIII*

The cyclic acrolein acetal of 1,2,6-hexanetriol prepared as in Example I was polymerized by adding a small catalytic amount of 50% wt. aqueous para-toluenesulfonic acid solution. The polymerization was slow at ambient temperature but on standing overnight clear, fairly tough and rubbery polymers were obtained. Equally good polymers were obtained by using the same amount of dry para-toluene sulfonic acid as the catalyst. Heating to about 80° C. accelerates the polymerization but results in some darkening of the product. The viscous partial polymers which are obtained air-dry to fairly tough films in a manner reminiscent of linseed oil.

Boron trifluoride etherate and stannic chloride both catalyzed the polymerization of this cyclic acetal at room temperature giving soft, transparent solids.

Copolymerization of the new cyclic acetals with compounds having ethylenic and/or hydroxyl groups can be carried out in the presence of acidic catalysts in the same way. In both homo- and copolymerization the initially formed gelatinous partial polymers can be cured using acidic or other suitable catalysts to obtain solid products particularly useful in making films and coatings.

It will thus be seen that many apparently widely different embodiments of this invention can be made without departing from the scope and spirit thereof, and it will be understood that the invention is not limited to the specific embodiments which have been given by way of illustration but only as defined in the appended claims.

We claim as our invention:
1. 2-vinyl-4-(delta-hydroxybutyl)-1,3-dioxolane.
2. 2-isopropenyl-4-(delta-hydroxybutyl)-1,3-dioxolane.
3. 2-(alpha-chlorovinyl) - 4 - (delta-hydroxybutyl)-1,3-dioxolane.

References Cited in the file of this patent

UNITED STATES PATENTS 2,729,650    Habeshaw et al. _____ Jan. 3, 1956